United States Patent [19]

Richter

[11] E Re. 31,581

[45] Reissued May 8, 1984

[54] APPARATUS FOR DETECTING FORCES DIRECTING THE MOVEMENT OF A MANIPULATING INSTRUMENT

[75] Inventor: Hans Richter, Augsburg, Fed. Rep. of Germany

[73] Assignee: Gesellschaft fur digitale Automation mbH, Munich, Fed. Rep. of Germany

[21] Appl. No.: 405,779

[22] Filed: Aug. 6, 1982

Related U.S. Patent Documents

Reissue of:

[64] Patent No.: 4,298,308
Issued: Nov. 3, 1981
Appl. No.: 78,280
Filed: Sep. 24, 1979

[30] Foreign Application Priority Data

Sep. 22, 1978 [DE] Fed. Rep. of Germany ..... 2841284

[51] Int. Cl.[3] ..... G05B 19/42; B25J 9/00

[52] U.S. Cl. ..... 414/730; 318/488; 318/568; 364/513

[58] Field of Search ..... 414/4, 5, 730; 318/488, 318/568; 364/513

[56] References Cited

U.S. PATENT DOCUMENTS

| | | | |
|---|---|---|---|
| 3,648,143 | 3/1972 | Harper et al. | 318/568 |
| 3,951,271 | 4/1976 | Mette | 414/730 X |
| 4,105,937 | 8/1978 | Tuda et al. | 318/568 |
| 4,187,454 | 2/1980 | Ito et al. | 318/568 |
| 4,283,764 | 8/1981 | Crum et al. | 364/513 |

*Primary Examiner*—Jeffrey V. Nase
*Attorney, Agent, or Firm*—Pollock, Vande Sande & Priddy

[57] ABSTRACT

An apparatus attached to a motor driven manipulating instrument for detecting and identifying specific forces employed in moving the instrument along a predetermined spatial track. The apparatus includes a center portion rigidly attached to the manipulating instrument and a sleeve member surrounding the center portion. A plurality of separate, flexible blades join the sleeve and center portions to each other, with a separate transducer fixedly attached to each flexible blade and capable of detecting bending forces employed to move the sleeve and attached instrument. The transducers generate output signals indicative of the magnitude and direction of the forces, which signals are used for establishing a program for controlling the actuation of the various motors to allow the instrument to repeatedly execute the course set forth in the program.

33 Claims, 5 Drawing Figures

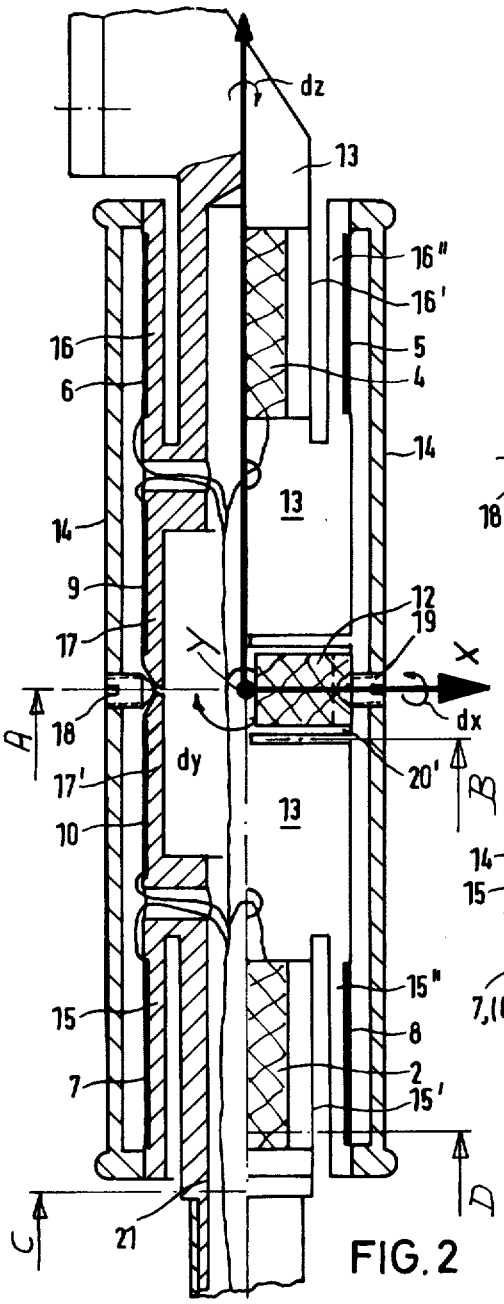
FIG. 2
FIG. 4
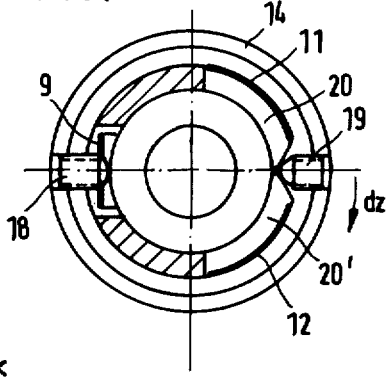
FIG. 3
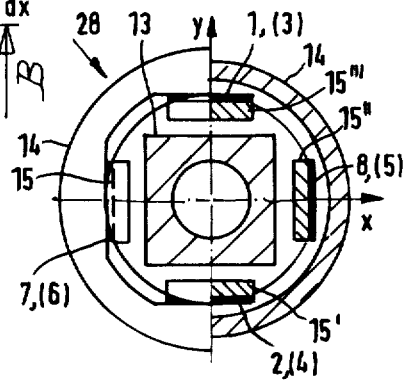

APPARATUS FOR DETECTING FORCES DIRECTING THE MOVEMENT OF A MANIPULATING INSTRUMENT

Matter enclosed in heavy brackets [ ] appears in the original patent but forms no part of this reissue specification; matter printed in italics indicates the additions made by reissue.

BACKGROUND OF THE INVENTION

The present invention generally relates to a motor-driven manipulating instrument adaptable for being programmed to repeatedly execute a predetermined series of spatial movements. In particular, the present invention is directed to a novel apparatus for generating a series of signals indicative of the specific movements of the instrument, which signals are adaptable for establishing a control program to control the drive motors and hence the movement of the instrument itself.

A manipulating robot instrument usually includes a control arm assembly formed from a plurality of attached members, with a hand attached to an end of the arm assembly for performing predetermined manipulations. For example, the hand may be employed in precision welding of two auto body parts to one another, thereby freeing a human operator from performing the repetitive and often boring task. However, in order to perform such work tasks, the robot hand must be able to precisely and repeatedly follow a predetermined spatial track.

One such known rotor assembly includes a composite arm assembly which can perform linear movement along two mutually perpendicular axes as well as rotation about one of the axes. As a result, the arm assembly is capable of executing a swiveling movement by combining the linear and rotative movements discussed hereabove. Furthermore, a hand member attached to such a known robot arm assembly can be rotated about an axis extending in the axial direction of the arm assembly as well as being rotatable about separate axes extending perpendicularly to each of the mutually perpendicular axes, respectively. Finally, a plurality of separate drive motors are arranged for driving the various component members of the arm assembly as well as the attached hand member.

In order to control the movement of the arm assembly, a control program is required for actuating the various drive motors in a predetermined sequence. In the known robot arm assembly, the desired track is usually divided into a series of linear sections, allowing the track curve to be approximated by straight-line linear movements which can be mathematically programmed. However, such mathematically originated programs are very complex and costly and, more importantly, can only roughly approximate the desired track.

In an effort to provide an assembly which more faithfully reproduces the desired spatial track, a further known robot arm assembly suggests that an elaborate template assembly surround the composite robot arm and hand assembly. The template assembly is formed from a plurality of seperate members which are positioned to follow the precise movements of the aggregate robot arm assembly. The template assembly carries a plurality of switches which are selectively activated upon contact with the various components of the rotor arm assembly. When activated, the switches close an electrical circuit which provides a signal indicative of a specific robot arm movement; with the signals being used to establish a control program for actuating the robot arm drive motors.

The exceedingly complicated layout of the above-referenced template assembly greatly increases the cost of programming the robot arm. In addition, an unavoidable time play must exist between the movement of the individual rotor arm members and activation of the various switch members, resulting in a significant variation between the actual movements of the rotor arm and the program generated by actuation of the switches. Furthermore, a further error or fault in programming is directly caused by the dead weight of the template itself, which dead weight can result in switch activation without a corresponding movement of the robot arm. In fact, actual tests have shown that such programming faults tend to lead to the robot arm following so-called jumpy or step curves rather than the continuous curves often required in welding operations or the like. The outlay required to compensate for such jumpy or step movements have made the use of a template commercially unacceptable.

As will be discussed in detail hereafter, the present invention provides an apparatus capable of precisely following the manual manipulations of a robot arm assembly and of generating a signal corresponding to such manipulations, which signal is adaptable for establishing a control program to control the robot arm drive motors for repeatedly manipulating the arm assembly.

OBJECTS AND SUMMARY OF THE PRESENT INVENTION

An object of the present invention is to provide a programming device capable of accurately detecting manually actuated movements of a robot arm assembly and generating electrical control signals indicative of such movements, which signals are adaptable for establishing a control program for operating drive motors to accurately repeat the manually actuated movements.

A further object of the present invention is to provide a programming device in the form of a handle having a rigid center portion attached to the robot arm assembly and an outer sleeve attached to the center portion via a plurality of separate flexible blade portions, with separate force detecting transducers mounted on each of the respective blade portions.

A yet further object of the present invention is to provide a programming device capable of generating an electrical signal in response to linear and/or rotative manipulation of the composite robot arm assembly.

Each of these objects, as well as additional objects, is achieved in a preferred embodiment of the present invention, wherein a handle-shaped device includes a center portion rigidly attached to a motor drive rotor arm assembly. The handle-shaped device further includes a sleeve-shaped member surrounding and connected to the center portion via a plurality of separate blade portions, wherein a first plurality of blade portions extend parallel to a longitudinal axis of the handle-shaped device and a second plurality of blade portions extend along the contour of the device and transversely to the longitudinal axis. A force transducer in the form of a wire strip is mounted on each blade portion. During operation, an operator merely grasps and moves the sleeve-shaped member to manually manipulate the rotor arm attached thereto. Because the sleeve-shaped member is attached to the rigid center portion via the flexible blade portions, initial movement of the sleeve results in expansion of at least one of the flexible blade portions and a corresponding expansion in the wire strip mounted thereon. As a result of expanding or stretching the wire strip, it is possible to alter the resistance of the wire to current flowing therethrough. This, in turn, results in the charging level of a control current flowing through the wire. By carefully noting the changing current levels flowing through the various wire strips, it is possible to accurately detect and reproduce the various linear and rotative movements of the handle-shaped device and robot arm assembly attached thereto.

The detailed operation of the present invention will become apparent from a reading of the following specification taken in conjunction with the attached drawings, wherein similar elements are designated by similar reference numerals.

BRIEF DESCRIPTION OF THE DRAWINGS

The present invention can be best understood in conjunction with the attached drawings, wherein:

FIG. 2 shows a partial longitudinal cross-section of the programming device formed in accordance with the embodiment shown in FIG. 1;

FIG. 3 shows a sectional view taken along a section line C–D in FIG. 2;

FIG. 4 shows a sectional view taken along section line A–B in FIG. 2; and

DETAILED DESCRIPTION OF PREFERRED EMBODIMENTS

The preferred embodiment of the present invention will now be described with reference to FIGS. 1–4, respectively. Movements will be described with reference to Cartesian co-ordinates designated by the mutually perpendicular axes X, Y and Z. In addition, rotary movements about the X and Y axes will also be discussed hereafter. While a Cartesian co-ordinate system has been employed for describing the present invention, it is evident that the present invention need not be limited to the Cartesian coordinate system but could be described with reference to Polar co-ordinates or the like.

Figure 1:
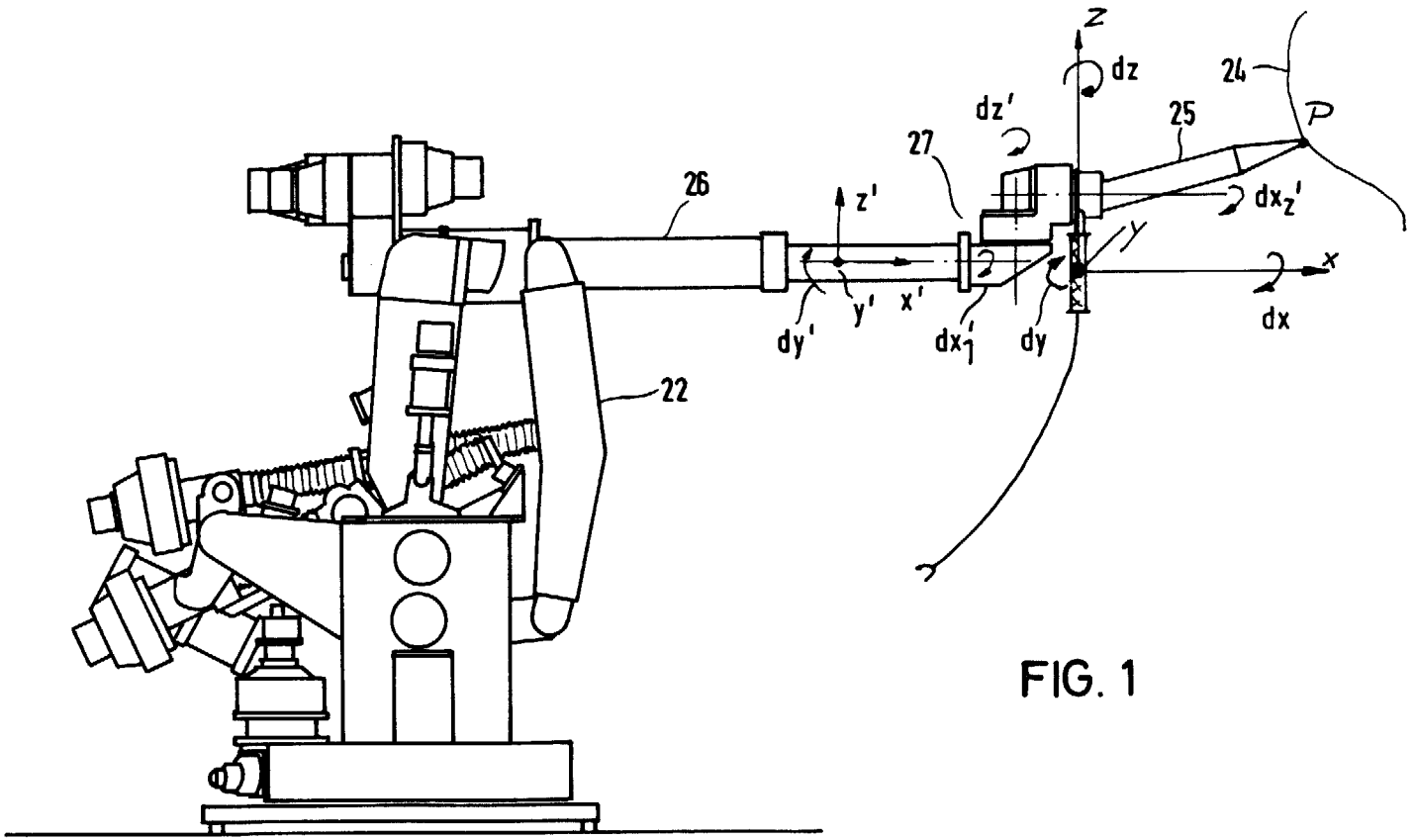
FIG. 1 shows a schematic representation of a manipulating instrument including a programming apparatus formed in accordance with the present invention.

Referring now to FIG. 1, a manipulating instrument or robot is generally designated by the numeral 22. Robot 22 includes a composite arm assembly 26 and a composite hand assembly 27 attached to an end portion of arm assembly 26. The movements of arm assembly 26 can be divided into separate linear components extending in the directions of the axes X', Y' and Z' as best shown in FIG. 1, wherein axis X' extends parallel to the longitudinal axis through arm assembly 26. In addition, arm assembly 26 can achieve rotary motion about the Y axis as designated by the arrow dy'. Hand assembly 27 includes a first member 27a which can perform rotary movement about the X' axis as denoted by the arrow $dx'_1$ in FIG. 1. Hand assembly 27 includes a second member 27b capable of performing rotary movement about the Z' axis, as denoted by the arrow dz'. Finally, hand assembly 27 includes a third member 27c which can perform rotary movement about an axis extending parallel to the X' axis, with this rotary movement being denoted by the arrow $dx'_2$. Each of the hand assembly members 27a–c as well as robot arm assembly 26 is individually powered by a separate motor assembly to allow for individual movement of the various arm and hand members as required to move a point P to a tool 25 attached to hand assembly 27 along a spatial curve generally designated at 24.

An apparatus capable of precisely detecting both linear and rotary movements of arm assembly 26 and hand assembly 27 is generally designated at 23. As will be described hereafter, the apparatus functions as a programming device, in that apparatus 23 provides output signals adaptable for establishing a control program for operating the various motor assemblies to control the movements of the various arm and hand members described hereabove. The linear movements of apparatus 23 will be described with reference to the Cartesian co-ordinate system designated by the X, Y and Z axes shown in FIG. 1. In addition, apparatus 23 is capable of performing rotary movements about the three mutually perpendicular axes as indicated by the arrows dx, dy and dz, respectively.

Referring now to FIG. 2, a longitudinal cross-sectional view of apparatus 23 is shown, wherein the left hand portion of FIG. 2 provides a cut-away view of a center portion 13 and surrounding sleeve member 14, while the right hand portion of FIG. 2 shows only a cross-sectional view of sleeve 14, with center portion 13 shown in the form of a top view.

Apparatus 23 takes the form of a handle-shaped member, wherein the center portion 13 is rigidly attached to hand member 27c and the longitudinal axis of apparatus 23 substantially corresponds with the Z axis of the above-described Cartesian co-ordinate system. The sleeve member 14 surrounds the center portion 13, with a first end portion of sleeve 14 being attached to center portion 13 via four spaced blade members 15, 15', 15'' and 15'''. Likewise, sleeve 14 includes a second, opposite end portion which is attached to center portion 13 via four additional blade members 16, 16', 16'' and 16'''. Each of the four blade members 15, 15', 15'', and 15''' are circumferentially spaced substantially 90° relative to one another and are arranged about the Z axis extending longitudinally through center portion 13. In a like manner, the four blade members 16, 16', 16'', and 16''' are also circumferentially spaced substantially 90° relative to each other about the Z axis extending longitudinally through center portion 13. Each of the blades members is formed of an elastically-deformable material which, in a preferred embodiment, may comprise a metal such as steel or the like. However, plastic materials capable of elastic deformation may also be employed, for example, but not limited thereto, those materials sold under the trademark "NYLON or DELRAN". It is considered within the scope of the present invention to substitute other materials for the blade member, provided such materials are capable of the type of elastic deformation discussed hereafter.

Turning again to FIG. 2, the four blades members 15, 15', 15'', and 15''' include a pair of blade members 15 and 15'' positioned on opposite sides of center portion 13 from one another and a further pair of blade members 15' and 15''' also positioned on opposite sides of the center portion 13 from one another. For purposes of explanation only, it will be considered that blade member 15 substantially faces arm assembly 26, while oppositely disposed blade member 15'' faces away from arm assembly 26 and substantially in the direction of tool 25.

In a like manner, the further blade assembly includes a plurality of four separate blades, with blade members 16 and 16'' positioned on opposite sides of center portion 13 from one another and blade members 16' and 16''' also positioned on opposite sides of center portion 13 from one another. Furthermore, in a preferred embodiment of the present invention, each of the blade members 16–16''' is axially aligned respective blade members 15–15''' as shown in FIG. 2.

A first set of data producers is fixedly attached to each of the blade members 15–15''', while a second, separate set of data producers is attached to each of the blade members 16–16''', respectively. In a preferred embodiment of the present invention, each of the data producers comprises an expandable strip of wire extending parallel to the longitudinal axis Z formed through apparatus 23. As will be described hereafter, each of the strips functions as a transducer to provide an electrical signal indicative of the expansion of the particular strip. In particular, blade members 15 and 15'' include the expanding strips designated 7 and 8, while blade members 15' and 15''' carry expanding strips designated 2 and 1, respectively. Likewise, the blade members 16 and 16'' carry the expanding strips designated 6 and 5, while the blade members 16' and 16''' include the expanding strips 4 and 3, respectively, wherein expanding strips 3–6 are shown in parentheses in FIG. 3.

In addition, two additional blade members 17 and 17' are attached to surface portions of center portion 13 positioned substantially half-way between blade members 15–15''' and 16–16''', respectively. Each of the blade members 17 and 17' extends substantially parallel to the longitudinal axis Z passing through center portion 13, with free end portions of the blades 17 and 17' facing each other. Expandable measuring strips 9 and 10 are fixedly mounted on blade members 17 and 17', with a bolt 18 being attached to sleeve 14 and projecting into snug engagement with recessed end portions formed on blades 17 and 17'.

A further pair of confronting blade members 20 and 20' are also mounted on center portion 13 as shown in FIG. 2. In particular, each of the blade members 20 and 20' extends along the contour of center portion 13 in a direction substantially transverse to the longitudinal axis Z, with the free end portions of blade members 20 and 20' facing one another and with a pair of expandable wire measuring strips 11 and 12 mounted on the blades 20 and 20', respectively. Finally, a bolt 19 is fixedly attached to sleeve 14 with an end portion of bolt 19 snuggly engaging a pair of recesses formed in free end portions of blades 20 and 20', respectively. Finally, duct 21 extends longitudinally through the interior of center portion 13 housing one or more electrical wires extending therethrough. As is well-known in the prior art, electrical current can be sent through each of the measuring strips 1–12, with the resistance of each strip to the flow of electrical current being directly related to the deformation of the particular strip. This means that a predetermined reference signal can be sent through the electrical wires extending through duct 21, with the reference signal passing through the expanding measuring strips 1–12 attached thereto. If a particular measuring strip is caused to expand due to the formation of a particular blade member attached thereto, resistance of the measuring strip to the flow of electrical current will vary in accordance therewith. As a result, the particular input reference signal will also be altered in a manner directly corresponding to the degree of expansion encountered by the measuring strips.

The altered output from the deformed measuring strips can be fed into a conventional computer assembly capable of interpreting the change in signal level and establishing a control program which can be used for driving the various electrical motors employed to move arm and hand assemblies 26 and 27, respectively. The preparation and execution of the control program makes up no part of the present invention and is therefore not described in detail herein.

The operation of the present invention will now be described with reference to FIGS. 2–4 in particular. If it is desired to have hand assembly 27 move along the X axis, an operator need merely grasp and move sleeve 14 in the direction of the arrow x, which results in the bending of the particular blade members 15 and 16 and the lengthening of the measuring strips 6 and 7 mounted thereon. As a result, resistance of the strips 6 and 7 to the predetermined reference signal extending therethrough will be altered, thus providing an output signal indicative of movement in the X direction. If it is desired to move hand 27 in the opposite direction, the pressure exerted on sleeve 14 results in the bending of blade members 15'' and 16'' and the expansion of measuring strips 5 and 8 mounted thereon. This, in turn results in a change in the resistance of strips 5 and 8 to the flow of electrical current therethrough, which is indicative to the degree of bending of the respective blade portions. In a like manner, if it is desired to move hand assembly 27 in the Y direction, proper movement of sleeve 14 results in the bending of blade members 15' and 16' and a corresponding lengthening in the measuring strips 2 and 4, respectively. Likewise, if it is desired to move hand assembly 27 in the opposite Y direction, an operator need only grasp and press sleeve 14, resulting in the bending of blade members 15''' and 16''' as well as the lengthening of measuring strips 1 and 3, respectively.

If movement in the Z direction is desired, sleeve 14 is pushed upwardly as shown in FIG. 2, whereby bolt 18 is caused to press against and deform blade member 17, resulting in the expansion of measuring strip 9 and the change of a reference signal flowing therethrough in a manner similar to the operation of strips 1–8. If, on the other hand, sleeve 14 is pulled downwardly, bolt 18 will abut and bend blade member 17' causing an expansion of measuring strip 10 mounted thereon.

As a result of the positioning of measuring strips 1–10, it is possible to detect linear movement of sleeve 14 along each of the axes, X, Y and Z, respectively. It is, of course, evident that linear movement between the various axes can also be detected through the expansion of a combination of the various measuring strips. For example, movement in the direction of the arrow 28 as shown in FIG. 3 will result in the expansion of the particular measuring strips 1, 3, 6 and 7, respectively, which will generate specific output signals which can be used to establish a program for actuating the drive motors to result in hand 27 moving in the direction of arrow 28.

The rotary motion dy about the Y axis is achieved by grasping and turning sleeve 14 whereby blades 16 and 15''' are bent, causing an expansion of the measuring strips 6 and 8, respectively. In a like manner, rotary movement in the direction opposite to dy results in the expansion of measuring strips 5 and 7, respectively. For rotary movement dx about the X axis, the measuring strips 1 and 4 are caused to expand, while rotation in the counter dx direction results in the expansion of measuring strips 2 and 3, respectively.

Finally, in the case of rotary movement dx about the Z axis, bolt 19 engages and bends blade member 20', causing expansion of measuring strip 12 mounted thereon. In a like manner, rotation in the counter dz direction, results in bolt 19 engaging and bending blade member 20, resulting in the expansion of measuring strip 11 mounted thereon. Naturally, an intermixing of the various rotary movements is possible, as well as an intermixing of the rotary and linear movements discussed hereabove.

In the preferred embodiment of the present invention described hereabove, each of the measuring strips 1–12 functions as a passive transducer having a variable resistance to the flow of electrical current, which resistance is dependent upon the degree of expansion of the particular measuring strip. During operation, a predetermined or referenced current is supplied through the various measuring strips, with the change in resistance causing a corresponding change in the reference current. It is also possible to utilize transducers which detect the change in inductance and/or capacitance rather than measuring the change in resistance as employed in measuring strips 1–12. If inductive transducers are employed, each of the transducers is mounted on a blade member and is attached to a capacitor, whereby deformation of the blade results in a corresponding change in the inductivity of the transducer mounted thereon. Such inductive transducers are also considered to be passive, in that, a reference signal must be initially provided through the various transducers. It is also possible to replace the passive transducers disclosed hereabove with active transducers which are capable of generating electrical signals as a direct result of the electrical and magnetic properties inherent in the materials forming the transducer strips themselves.

In a further embodiment of the present invention, each pair of parallel extending, oppositely disposed measuring strips can be replaced by a single measuring strip which is capable of generating a first signal indicative of the expansion of the measuring strip and a second, further signal indicative of the compression of the measuring strip. As a result, the expanding measuring strips 1–8 which become operative in pairs to detect the rotary movements about the X and Y axes, respectively, can be replaced by two measuring strips arranged at substantially right angles to one another, with the measuring strips providing variable changes in the resistance to the flow of electrical current depending upon the particular direction of rotation of the sleeve 14. In other words, a change in the resistance of the measuring strip to rotation in the dx direction would differ from the change in resistance of the strip to rotation in the counter dx direction.

In a further embodiment of the present invention, it is possible to substitute a plurality of switches for the expanding measuring strips 1–12, whereby the switches generate positive or negative signals indicative of the various movements of the apparatus 23. However, data producers such as the expanding measuring strips 1–12 are preferable in their ability to measure the magnitude of the various forces acting on sleeve 14 and center portion 13, whereby the magnitude of the relevant force applied to the hand assembly 27 can be measured and converted into a control program for operating the various drive motors to manipulate instrument assembly 22.

The following table lists the various movements which an operator may perform on sleeve 14 and attached center portion 13, resulting in the corresponding movement of attached arm 27. The table also indicates which measuring strips will be expanded as a result of the various movements of the apparatus 23.

Figure 5:
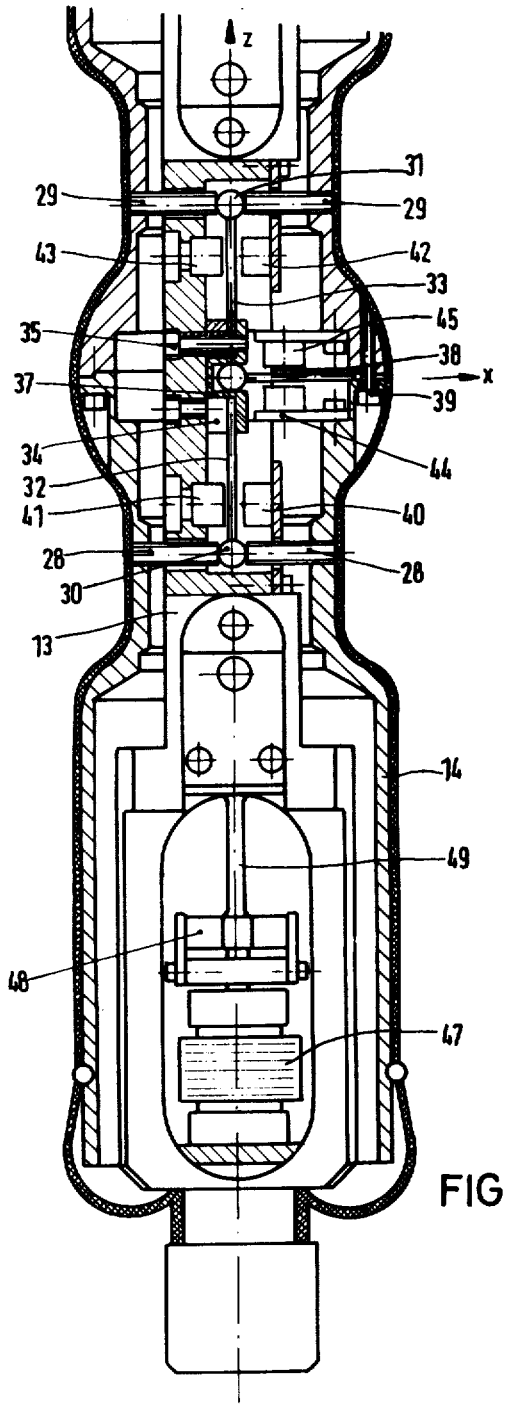
FIG. 5 shows a partial longitudinal cross-section of an alternate programming device.

A further embodiment of the present invention is disclosed in FIG. 5, wherein a sleeve 14 surrounds and is relatively movable with respect to a center portion 13 rigidly connected to hand member 27c. Sleeve 14 is provided with two first stops 28 and two second stops 29, wherein stops 28 adjoin without play a ball 30 and stops 29 adjoin a ball 31. Ball 30 is supported by a first spring member 32 which, in turn, is clamped to center portion 13 at a point generally designated 34. Ball 31 is likewise supported by a second spring member 33 which includes an end portion clamped to center portion 13 at a point 35. The ball-carrying end portions of springs 32 and 33 point in opposite directions, as shown in FIG. 5. In addition a pair of inductive-type data producers 40 and 41 are mounted on opposite sides of spring 32, while a pair of inductive-type data producers 42 and 43 are mounted on opposite sides of springs 33, respectively. Each pair of oppositely disposed data producers 40, 41 and 42, 43 receives an electrical current. If a force is exerted on sleeve 14 in the direction of the X axis, springs 32 and 33 will be deformed toward transducers 40 and 42, causing these transducers to be detuned by identical values in one direction with the remaining transducers 41 and 43 being detuned by identical values in the opposite direction. Likewise, if a force is exerted on sleeve 14 in a direction opposite to the arrow x, the transducers 41 and 43 are detuned by identical values in one direction, with the remaining data producers 40 and 42 being detuned by different identical values in the opposite direction. When a force is applied to the sleeve 14 about the Y axis in the direction dy, transducers 40 and 43 are detuned by identical values in one direction, while the remaining transducers 41 and 42 are detuned in the opposite direction by identical values.

In a further, not illustrated system can be arranged between sleeve 14 and center portion 13 for matching the components 28–43, which system is offset at a substantially 90° angle relative to the above-described system with elements 28–43 and which allows for the detection of forces within the Y axis to cause rotation of the sleeve 14 in the direction dx. It is noted that sleeve 14 is fastened at a point 39 to a spring 38 which carries a ball positioned within a slot 37 formed in the center portion 13. In addition, a pair of inductive-type transducers 44 and 45 are positioned on opposite sides of spring 38. If a force is exerted on sleeve 14 in the Z direction, transducers 45 is detuned in one direction while transducers 44 is detuned in a further, opposite direction. If a force is exerted in a direction opposite to the Z arrow shown in FIG. 5, the inductive-type transducer 45 is detuned in one direction, while the remaining trasducer 44 is detuned in the opposite direction. Likewise, if a force is exerted in a direction opposite to the Z direction shown in the arrow, the transducers 44 and 45 are also detuned in the opposite direction.

A torsion rod 49 extends substantially parallel to the longitudinal axis of sleeve 14, which longitudinal axis also corresponds to the Z axis. Torsion rod 49 includes a first end portion attached to a transducer 48 and a further, opposite end portion clamped to center portion 13. Transducer 48, in turn, is attached to a folding bellows coupling 47 which engages sleeve 14, with coupling 47 being capable of transferring only turning forces. During operation, if sleeve 14 is caused to turn in either direction about the Z axis, transducer 48 is detuned in one of two oppositely disposed directions because transducer 48 is caused to change its axial spacing from center portion 13 as torsion is applied to rod 49.

In the embodiment disclosed in FIG. 5, data producers 40–45 and 48 comprise tuned circuit elements wherein the inductance and capacitance of the circuit elements can be altered by adjusting the physical distance between the coil springs 32, 33 and 38 and the respective circuit elements mounted on either side thereof. The resulting change in inductance and/or capacitance results in the effective detuning of the circuit, which detuning can be used as a basis for establishing a conventional program for controlling the drive motors attached to the arm and hand assemblies 26 and 27, respectively.

The table shown below lists the various movements and indicates which of the data producers 1–12 generate signals as a result of these movements.

| Movement | | Signal generation at |
|---|---|---|
| linear | +X | 6 and 7 |
| | −X | 5 and 8 |
| | +Y | 2 and 4 |
| | −Y | 1 and 3 |
| | +Z | 9 |
| | −Z | 10 |
| rotary | +dx | 1 and 4 |
| | −dx | 2 and 3 |
| | +dy | 6 and 8 |
| | −dy | 7 and 5 |
| | +dz | 12 |
| | −dz | 11 |

The present invention is not to be limited to the abovedescribed embodiments, but is to be limited only to the subject matter defined in the following claims.

I claim:

1. In combination with a motor driven manipulating arm capable of movement along mutually perpendicular axes, an apparatus for programming said manipulating arm to precisely repeat a sequence of movements, said apparatus comprising:

a handle assembly including a center part rigidly attached to said manipulating arm for joint movement therewith, said handle assembly further including an outer sleeve portion surrounding said center part;

flexible coupling means for joining said outer sleeve to said center part while allowing limited relative movement therebetween; and, data transducer means mounted on said handle assembly for detecting forces acting on said outer sleeve and generating output signals indicative of the magnitude and direction of said forces, whereby said signals are employed to create a playback program directing said motor driven manipulating arm to repeatedly perform the same sequence of movements.

2. Apparatus as defined in claim 1, with the characteristic that, in order to program two axes (X, Y), extending perpendicularly to each other, there is provided for each axis at least one pair of opposed data transducer means arranged at the center part and offset by 90° relative to each other, said opposed data transducer means each form pairs of data transducers for responding to forces acting transversely to the axis extending longitudinally through the center part.

3. Apparatus as defined in claim 1, with the characteristics that, in order to program two axes (X, Y) extending perpendicularly to each other, there is provided for each axis at least one pair of opposed data transducer means for each of the axes X and Y, wherein the data transducer means of one of the pairs are arranged about the center part and are offset 180° relative to each other to respond to forces acting transversely to the axis extending longitudinally through the center part, and that the data transducer means of the other pair are also arranged along the longitudinal axis through the center part for responding to forces along the longitudinal axis.

4. Apparatus as defined in claims 2 or 3, with the characteristics that, in order to program three axes (X, Y, Z) extending perpendicularly to each other, there is provided for each axis at least one pair of opposed data transducer means wherein the data transducer means of two pairs are arranged about the center part and are offset 90° relative to each other and that the data transducer means of the third pair are arranged along the longitudinal axis of the center part, and where oppositely disposed data transducer means of the first two pairs each form one pair to respond to forces acting transversely to the longitudinal axis of the center part, and where the two data transducer means of the third pair are positioned for responding to forces acting in the direction of the longitudinal axis of said center part.

5. Apparatus as defined in claim 1, with the characteristic that, in order to program rotary movements within an axis extending transversely to the longitudinal axis of the center part, there is provided at least one first pair of data transducer means arranged at one end of the center part and offset by 180° relative to each other, to respond to rotary movements about said axis extending transversely to the longitudinal axis of said center part.

6. Apparatus as defined in claim 5, with the characteristic that there is provided a second pair of data transducer means symmetrically arranged with respect to said first pair of data transducer means.

7. Apparatus as defined in claim 5, with the characteristics that, in order to program.rotary movements about two axes (X,Y) which are perpendicular to each other and extend transversely to the longitudinal axis of the center part, there is provided an additional pair of data transducer means offset by 180° relative to each other and by 90° relative to said first pair of data transducer means and arranged at opposite longitudinal ends of the center part, wherein a combination of said first pair and said additional pair of data transducer means are positioned for responding to rotary movements about the associated axis (X and Y).

8. Apparatus as defined in claim 1, with the characteristic that there is provided a fourth pair of data transducer means symmetrically arranged with respect to said additional pair of data transducer means.

9. Apparatus as defined in claims 6 or 8, wherein a single data transducer means is positioned adjacent to said center part for generating a first signal responsive to rotation of said outer sleeve in a first signal responsive to rotation of said outer sleeve in a first direction and generating a second, further signal responsive to rotation of said outer sleeve in a second direction opposite to said first direction.

10. Apparatus as defined in claims 6 or 8, with the characteristic that the data transducer means producers are arranged at the center part and are offset 90° relative to each other.

11. Apparatus as defined in claim 1, with the characteristic that, in order to program rotary movements about an axis (Z) extending parallel to the longitudinal axis of the center part, there is provided a further pair of data, transducer means arranged along the circumferential surface of the center part for responding to rotary movements about said axis (Z).

12. Apparatus as defined in claim 1, with the characteristic that the data transducer means are mounted on a plurality of separate elastic blades which extend between end portions of the center part, and corresponding end portions of the surrounding sleeve member.

13. Apparatus as defined in claim 12, with the charateristic that the data transducer means comprise a plurality of expanding strain gages.

14. Apparatus as defined in claim 1, with the characteristics that, in order to program two axes (X, Y) extending perpendicularly to each other as well as extending perpendicular to said longitudinal axis of said center part there is provided at least one data transducer means for each perpendicularly extending axis with each data transducer means arranged at the center part and offset 90° relative to each other, for responding to forces acting transversely to the longitudinal axis of the center part.

15. Apparatus as defined in claims 14 or 1, wherein said data transducer means comprises a single data transducer means for generating a first signal when subjected to compressive stress and a second, different signal when subjected to tensile stress.

16. Apparatus as defined in claim 14, with the charcteristics that, in order to program two axes (X, Z) including the longitudinal axis of said center part and a further axis extending perpendicularly thereto, wherein each axis is provided with at aleast one data transducer means, with each data transducer means arranged at the center part and offset 90° relative to each other, wherein one of the data transducer means is positioned for responding to forces acting along a further axis transversely to the longitudinal axis of the center part and the other data transducer means is positioned for responding to forces parallel to said longitudinal axis (Z).

17. Apparatus as defined in claim 14 or 16, with the characteristics that, in order to program three separate axes (X, Y Z) extending mutually perpendicularly to each other, there is provided for each axis at least one pair of data transducer means arranged at the center part, wherein each pair of data transducer means is offset 90° relative to each other, and where two of the data transducer means are positioned for responding to forces acting transversely to the longitudinal axis of the center part and the third data transducer means is positioned for responding to forces acting parallel to said longitudinal axis.

18. Apparatus as defined in claim 17, with the characteristic that there is fastened to the sleeve a third spring, having an end engaging a slot formed in the center part.

19. Apparatus as defined in claim 14 or 16, with the characteristics that there is fastened to the center part a first spring, having an end portion resting between two first stops attached to the sleeve, and that there is fastened to the center part a second spring having an end resting between two second stops of the sleeve, said second stops offset by 90° relative to the first stops.

20. Apparatus as defined in claim 1, with the characteristics that, in order to program rotary movements within an axis (for example Y) extending transversely to the longitudinal axis (Z) of the center part, there is provided at least one first pair of data, transducer means each arranged at an opposite end of the center part and offset 180° relative to each other for responding to rotary movements about said axis (Y).

21. Apparatus as defined in claim 20, with the characteristic that there is provided a second pair of data transducer means symmetrically arranged with respect to said first pair of data transducer means.

22. Apparatus as defined in claims 20 or 21, with the characteristics that, in order to program rotary movements about two axes (X, Y) which run perpendicularly to each other and transversely to the longitudinal axis of the center part, where is provided an additional pair of data transducer means arranged at the center part and offset 180° relative to each other and further offset 90° relative to the first pair of data transducer means, with each pair of data transducer means positioned for responding to rotary movements about one of said perpendicularly extending axes.

23. Apparatus as defined in claim 22, with the characteristic that there is provided a fourth pair of data transducer means symmetrically arranged with respect to said additional pair of data transducer means.

24. Apparatus as defined in claim 22, with the characteristic that there are provided two additional springs which extend toward the first and the second spring, respectively, and are offset 180° relative to one another.

25. Apparatus as defined in claim 1, with the characteristic that, in order to program rotary movements about an axis which extends parallel to the longitudinal axis of the center part, there is provided a data transducer means positioned for responding to rotary movements about said longitudinal axis (Z).

26. Apparatus as defined in claim 25, with the characteristic that the data transducer means is arranged between a torsion rod having an end clamped to the center part, and a separate, pivoting coupling communicating with the sleeve.

27. Apparatus as defined in one of the claims 20 or 21, or 25, with the characteristic that the pairs of data transducer means are each replaced by a single data transducer means capable of generating a first signal in the case of a compression stress and a second, different signal in the case of a tensile stress.

28. Apparatus as defined in one of the claims 14 or 16 or 20 or 21 or 25, with the characteristic that the data transducer means are adjacently disposed to a plurality of springs extending between the sleeve and the center part.

29. Apparatus for programming a motor driven manipulating arm assembly to precisely repeat a sequence of movements, said apparatus comprising:

a manually operated handle assembly including a center part rigidly attached to said manipulating instrument for joint movement therewith and an outer sleeve surrounding said center part;

a plurality of separate flexible blades for joining said center part to said outer sleeve while allowing limited relative movement therebetween; and data transducer means mounted on said handle assembly for detecting forces acting on said outer sleeve and generating output signals indicative of the magnitude and direction of said forces, whereby said output signals are employed to create a playback program directing said motor driven manipulating arm to repeatedly perform the same seqeuence of movements.

30. In an apparatus according to claim 29, wherein a plurality of said flexible blades extend between each end portion of said outer sleeve and a confronting end portion of said center part, with said flexible blades extending substantially parallel to a longitudinal axis passing through said center part and said flexible blades offset substantially 90° as measured about a circumference of said cylindrically-shaped center part.

31. In an apparatus according to claim 30, wherein said data transducer means comprises a plurality of transducer wire strips each mounted on a separate flexible blade, wherein respective flexible blades and the respective transducer wires mounted thereon deform in response to movement of said sleeve relative to said center part, with the deformed transducer wires providing a charge in resistance to the flow of electric current therethrough which is directly proportional to the amount of deformation.

32. In an apparatus according to claim 31, wherein a pair of flexible blades extend circumferentially about the contour of said center part and include free ends disposed adjacent to one another, with a bolt attached to said sleeve member having an end portion engaging a pair of recesses formed in the free end portions of said circumferentially extending blades and a separate transducer wire strip mounted on each circumferentially extending blade.

33. In an apparatus according to claim 31, wherein a pair of flexible blade members are attached to surface portions of said center part positioned substantially half-way between opposite end portions of said center part, with said further pair of flexible blades arranged in end to end relationship extending in a direction parallel to the longitudinal axis of said center part, said apparatus further including a bolt attached to said sleeve and having an end portion engaging confronting free end portions of said further pair of longitudinally extending flexible blades, with a separate transducer wire strip mounted on each blade for generating a change in resistance to the flow of electric current in response to deformation of an attached blade.

* * * * *